(12) United States Patent
Chaiko

(10) Patent No.: US 6,822,035 B2
(45) Date of Patent: Nov. 23, 2004

(54) PROCESS FOR THE PREPARATION OF ORGANOCLAYS

(75) Inventor: David J. Chaiko, Naperville, IL (US)

(73) Assignee: The University of Chicago, Chicago, IL (US)

( * ) Notice: Subject to any disclaimer, the term of this patent is extended or adjusted under 35 U.S.C. 154(b) by 129 days.

(21) Appl. No.: 10/078,992

(22) Filed: Feb. 20, 2002

(65) Prior Publication Data
US 2003/0162877 A1 Aug. 28, 2003

(51) Int. Cl.[7] .................................................. C08K 3/34
(52) U.S. Cl. .................... 524/445; 524/447; 524/186; 501/145; 501/148
(58) Field of Search .................. 524/497, 445, 524/446, 447, 449, 186, 488; 501/148

(56) References Cited

U.S. PATENT DOCUMENTS

| | | | |
|---|---|---|---|
| 3,977,894 A | 8/1976 | White | |
| 4,412,018 A | 10/1983 | Finlayson et al. | |
| 4,434,075 A | 2/1984 | Mardis et al. | |
| 4,435,217 A | 3/1984 | House | |
| 4,517,112 A | 5/1985 | Mardis et al. | |
| 4,810,734 A | 3/1989 | Kawasumi et al. | |
| 5,552,469 A | 9/1996 | Beall et al. | |
| 5,554,670 A | 9/1996 | Giannelis et al. | |
| 5,582,638 A | 12/1996 | Coutelle et al. | |
| 5,645,758 A | 7/1997 | Kawasumi et al. | |
| 5,698,624 A | 12/1997 | Beall et al. | |
| 5,726,247 A | 3/1998 | Michalczyk et al. | |
| 5,747,560 A | 5/1998 | Christiani et al. | |
| 5,837,763 A * | 11/1998 | Ferraro et al. | 524/449 |
| 5,840,796 A | 11/1998 | Badesha et al. | |
| 5,876,812 A | 3/1999 | Frisk et al. | |
| 5,910,523 A | 6/1999 | Hudson | |
| 5,962,553 A | 10/1999 | Ellsworth | |
| 6,034,163 A | 3/2000 | Barbee et al. | |
| 6,036,765 A | 3/2000 | Farrow et al. | |
| 6,043,300 A | 3/2000 | Santhanam | |
| 6,060,549 A | 5/2000 | Li et al. | |
| 6,084,019 A | 7/2000 | Matayabas, Jr. et al. | |
| 6,103,817 A | 8/2000 | Usuki et al. | |
| 6,136,908 A | 10/2000 | Liao et al. | |
| 6,156,835 A | 12/2000 | Anderson et al. | |
| 6,172,121 B1 * | 1/2001 | Chaiko | 516/101 |
| 6,225,374 B1 | 5/2001 | Vaia et al. | |
| 6,271,297 B1 | 8/2001 | Ishida | |
| 6,271,298 B1 | 8/2001 | Powell | |
| 6,380,295 B1 * | 4/2002 | Ross et al. | 524/443 |
| 6,407,155 B1 | 6/2002 | Qian et al. | |

OTHER PUBLICATIONS

Jordan, John W., "Organophilic Bentonites," *J. Phys. Colloid Chem.*, vol. 53, pp. 294–306, 1949, published by Baltimore, Williams & Wilkins Co.

Kawasumi, M., et al., "Liquid Crystalline Composite Based on a Clay Mineral," *Mol. Cryst. Liq. Cryst.*, vol. 281, pp. 91–103, 1996, published by Gordan and Breach Science Publishers SA, printed in Malaysia.

Kawasumi, M., et al., "Preparation and Mechanical Properties of Polypropylene—Clay Hybrids," *Macromolecules*, vol. 30, pp. 6333–6338, 1997, published by American Chemical Society.

Hasegawa, N., et al., "Preparation and Mechanical Properties of Polypropylene–Clay Hybrids Using a Maleic Anhydride–Modified Polypropylene Oligomer," *J. Appl. Poly. Sci.*, vol. 67, pp. 87–92, 1998, published by John Wiley & Sons, Inc.

* cited by examiner

Primary Examiner—Katarzyna Wyrozebski
(74) Attorney, Agent, or Firm—Foley & Lardner LLP (57) ABSTRACT

A method for preparing organoclays for use as rheological control agents and in the preparation of nanocomposites. Typically, the clay is dispersed in water, and a specific amount of polymeric hydrotrope, ranging from 0.1 to 15 weight percent relative to the weight of the clay, is adsorbed onto the clay surface. Quaternary amine exchange is also performed on the clay to modify the surface hydrophilic/lipophilic balance (HLB) of the clay.

39 Claims, 7 Drawing Sheets

PROCESS FOR THE PREPARATION OF ORGANOCLAYS

This invention was made with Government support under Contract No. W-31-109-ENG-38 awarded by the U.S. Department of Energy. The Government has certain rights in this invention.

FIELD OF THE INVENTION

The present invention relates to a method for preparing organoclays, including clays purified in the conventional manner. More particularly, the invention relates to methods for the surface modification of clays using polymeric hydrotropes to produce organoclays with improved efficiency and dispersability in nonpolar solvents and polymer systems.

BACKGROUND OF THE INVENTION

Organoclays with a wide range of surface wetting characteristics have been described in the literature. It is well known that surface treatment can be used to render hydrophilic clay surfaces compatible with solvents of decreasing polarity such as alcohols, ethers, aromatic and aliphatic hydrocarbons, and the like. Conventional hydrophilic organoclays have been prepared by onium ion exchange using polyethyer substituted quaternary ammonium compounds. These organoclays are dispersible in water-based systems and can be used for rheology control in products such as latex paints. Other methods for preparing organoclays displaying surface properties ranging from hydrophilic to hydrophobic have been produced by surface modification of the clay through polymer adsorption rather than onium ion exchange. For example, clay/polymer intercalates have been produced through direct intercalation of clays with either polymer melts, as described in U.S. Pat. No. 5,955,535, or by contacting a clay slurry with a polymer solution followed by drying. These organoclays can be used in forming composites with thermoplastic or thermosetting resins, however they suffer from the drawback that the efficiency of exfoliation can be low due to the potential for cross linking of the clay platelets by the surface-modifying polymer.

Traditionally, hydrophobic organoclays have been prepared through onium ion exchange from a smectite-type clay by surface exchange with high molecular weight quaternary ammonium salts, such as dimethyl dihydrogenated tallow ammonium chloride, dimethyl benzyl hydrogenated tallow ammonium chloride, and methyl benzyl dihydrogenated tallow ammonium chloride. Other onium ions that have been used include phosphonium and sulfonium ions. Another variation described in the literature for making organoclays involves the preparation of a hydrophobic organoclay by onium ion exchange followed by intercalation of a hydrophilic or hydrophobic polymer melt. However, this method of producing organoclays does not directly bind the organic polymers to the clay surface. Consequently, these organoclays cannot be dispersed in a solvent system without loss of the polymer from the clay surface which leads to uncontrolled changes in the surface wetting properties of the organoclay. Additionally, these types of organoclay intercalates do not completely exfoliate in the absence of specific chemical polymerization reactions. This method of producing organoclays is further limited to organoclays that have been surface treated with onium ions having carbon chain lengths equal to or greater than 12. Moreover, the amount of polymer required to modify the surface hydrophilic-lipophilic balance (HLB) value of the clays is typically from 30 to 100 weight percent, or more, relative to the weight of the organoclay, thereby making this approach both costly and inefficient.

In any organoclay application, and especially in the preparation of nanocomposites, obtaining a good dispersion of the clay has always been problematic. Smectite clays have extremely large surface areas and because of their nanoscale, their behavior is dominated by a complex balance of surface chemical forces. It is well known in the patent literature that maximum organoclay dispersion in organic solvents, and hence gelling efficiency, requires the addition of low-molecular-weight polar organic compounds. Various "polar activators" as they are called, have been recommended and include low-molecular-weight ketones and alcohols—with methanol and acetone being preferred. The polar activators are typically combined with small amounts of water and are used at levels ranging from 20 to 60 weight percent relative to the weight of the organoclay. Propylene carbonate has been recommended where the volatility of the activator is a concern. It is believed that the polar organic compounds encourage delamination and dispersion of the organoclay by solvating the high-molecular-weight ammonium ion at the basal surface of the organoclay which in turn affects the inter-platelet associations (i.e., basal spacing) resulting from the van der Waals attractions between surfactant chains and the clay surface. The small amount of water added with the polar activator promotes gellation via bridging between hydrophilic platelet edges. To this end, full rheological effectiveness requires unobstructed access to the hydrogen bonding sites on the clay edges.

The pioneering work in the 1940s showed that increasing chain length of the amine and increasing amine loading leads to more complete coverage of the basal clay surface. This work is discussed in J. W. Jordan, B. J. Hook, and C. M. Finlayson, J. Phys. Colloid Chem. 54, 1196–1208 (1950). For example, approximately 80 percent of the basal surface is covered by amine molecules lying flat at an octadecylamine loading of 100 milliequivalents per 100 g of clay. However, maximum solvation of the hydrocarbon chains of the amine would require the hydrocarbon chain to lift off from the clay surface thereby exposing a hydrophilic, silicate surface. Jordan postulated that the polar organic activators facilitated the solvation of the hydrocarbon chains by simultaneously lifting the hydrocarbon chains on end and shielding the exposed silicate surface.

Self-activating organoclays have also been described and represent an improvement in performance. Self-activation has been achieved through various approaches including manufacturing and compositional modifications. For example, a common approach is to overtreat a clay with a 10 to 25 percent excess of a quaternary amine above the ion exchange capacity of the clay. To maximize the self-activating characteristic, this treatment approach usually requires that amine exchange of the clay be carried out in the presence of low molecular weight polar activators such as alcohols, ketones, ethers, carboxylic acids, carboxylic esters, and amides, as described in U.S. Pat. No. 4,365,030. In a slight variation on his approach, higher molecular weight anionic compounds such as carboxylic acids having low water solubility (e.g., stearic acid) have been used as self-activating agents in conjunction with amine treatment. In this approach, the anionic carboxylic acid forms a water-insoluble complex which attaches to the basal surface of the clay leaving the edge unobstructed.

Analogous approaches have been used to enhance the exfoliation of organoclays during the preparation of a variety of clay/polymer nanocomposites wherein a high molecular weight polar compound is used to activate the organoclay. Examples of activators which also function to compatibilize the organoclay with the polymer matrix include, polyolefin oligomers with telechelic OH groups and maleic anhydride-modified polyolefin oligomers. Oligomeric activators have been used at levels comparable to those of the low molecular weight polar activators. Because of the higher molecular weight of the oligomeric activators, the total organic loading on the organoclay necessary to achieve the desired degree of exfoliation exceeds 70 to 75 weight percent making this approach both expensive and inefficient. In addition, organic solvents are often required to facilitate intercalation of the oligomer which increases cost and manufacturing difficulty. Additionally, the efficiency with which the high molecular weight compatabilizers increase the basal spacing of the organoclay is surprisingly low. For example, telechelic polyolefins reportedly increase the basal spacing of an amine-treated montmorillonite from 33 Å to only 38 Å at a mixture ratio of 1:1. These results are reported in U.S. Pat. No. 6,121,361. This small increase in basal spacing suggests that not all of the oligomer becomes intercalated within the organoclay gallery. Because of the polar functional groups employed by this approach, it is not unreasonable to presume that a portion of the oligomer attaches to the edge of the clay and may actually block access to the organoclay galleries.

In summary, under current methods, large quantities of volatile, low molecular weight, polar activators are required to ensure complete exfoliation of organoclays in nonpolar systems. In the formation of clay/polymer nanocomposites, the volatile, low molecular weight, polar activators are undesirable and are replaced by surface active oligomers. However, the amount of oligomeric activator required is 20 to 100 weight percent, or more, relative to the weight of the organoclay making the approach impracticable.

prior art produces organophilic clays that, at least structurally, bear resemblance to the lamellar liquid crystal (LLC) phases found in oil/water/surfactant systems. When an organic solvent is intercalated within the galleries of the organoclay, the alkyl chains of the onium ion lift off from the clay surface producing an LLC structure. In this system, the hydrophilic silicate surface takes the place of the water surface in the oil/water/surfactant system. And just like the LLC phases, the organoclay analogues are highly viscous when the organoclay is fully exfoliated. While organoclays will spontaneously swell in the presence of a suitable organic solvent, the traditional organoclays will not spontaneously disperse into an excess of the organic solvent. In other words, the capacity of the organoclay to solubilize organics is limited. In this regard, the organoclays bear further resemblance to the LLC phases of oil/water/ surfactant systems. It is well known from the surfactant literature that LLC's have a limited capacity to solubilize organics via intercalation of the hydrocarbon region of the LLC. Even in highly swollen LLC phases, where the hydrocarbon chains of the surfactant adopt a fully extended conformation, the terminal groups of the surfactant chains in adjacent surfactant monomolecular layers remain in contact. This is now understood, from the surfactant literature, to be due to entropic effects wherein the surfactant chains exhibit an order parameter that is intermediate between that of a liquid and a solid. Hence, the LLC phase is not compatible with a bulk isotropic liquid hydrocarbon phase. Furthermore, the common assumption expressed in the nanocomposite literature that the interlayer structure of organoclays is disordered and liquid-like is inconsistent with the behavior of LCC structures found in oil/water/surfactant systems.

It is now understood from the surfactant literature that increased organic solubility in oil/water/surfactant systems can be achieved through the use of hydrotropes. The most effective hydrotropes are typically low-molecular-weight organic compounds that disrupt the normal surfactant packing geometry necessary for the formation of the lamellar structure. High-molecular-weight hydrotropes have also been discovered which lead to enhanced organic solubility in LLC phases, again by disrupting the alkyl chain packing within the LLC phase. The high-molecular-weight hydrotropes include the difunctional surfactants produced by Westvaco, of which the dicarboxylic acid; 5-(and 6-) carboxy-4-hexyl-2-cyclohexene-1-yl octanoic acid is an example. While the incorporation of a hydrotrope can increase the solvating capacity of LLC phases, that capacity is not unlimited and the interlayer spacing does not normally exceed the length of the fully extended hydrocarbon chains. This situation is similar to that of the organoclay/ hydrocarbon systems.

The most unusual LLC phases are those containing nonionic surfactants of the type n-alkyl polyethylene glycol ether. The lamellar phase of n-dodecyl tetraethylene glycol ether is reported to be capable of solubilizing alkyl hydrocarbons to such an extent that they form a liquid hydrocarbon layer between the layers of surfactant molecules thereby producing a hydrocarbon layer thickness of 60 Å. This exceptional capacity to solubilize hydrocarbons has been shown to be due to the high motional disorder of the surfactant hydrocarbon chains. In other words, the more liquid-like the surfactant chains, the more compatible they become with an isotropic oil layer.

The relevance of LLC phase behavior to the issue of organoclay exfoliation, and hence nanocomposite formation, is two fold. For exfoliation to occur, the interfacial tension between the organoclay and the organic phase (i.e., polymer phase in nanocomposite systems) must be low enough to permit wetting. However, in light of the previous discussion, this condition is not expected to be sufficient to promote exfoliation—a high motional disorder of the surfactant hydrocarbon chains is also required The impact of surfactant order/disorder was in fact partially recognized in the mid 1950s as discussed in J. W. Jordan and F. J. Williams, Kollid Zeitschrift, 137, 40–48 (1954). Specifically, Jordan showed that parallel alignment of the organoclay platelets, which could result from mechanical working of the wet filter cake prior to and during drying, markedly diminished the dispensability of the dried organoclay.

Under prior art methods, large quantities of volatile, low-molecular-weight, polar activators were required to ensure complete exfoliation of organoclays in nonpolar systems. In the formation of clay/polymer nanocomposites, the volatile, low-molecular-weight, polar activators were undesirable and replaced by surface active oligomers. However, the amount of oligomeric activator required was still 20 to 100 weight percent, or more, relative to the weight of the organoclay making the approach impracticable. The present invention overcomes these, and other problems associated with the design and production of organoclays. This invention is based on the inventor's discovery that the same entropic effects that create a barrier to unlimited swelling in LLC systems also create a barrier to unlimited swelling and spontaneous exfoliation or organoclays in polymer systems and that increased osmotic pressures within organoclay galleries due to extensive swelling aids particle dispersion and exfoliation. More specifically, the invention is based on the discovery that incorporating high-molecular weight hydrotropes into organoclays results in enhanced swelling capabilities in non-polar systems.

SUMMARY OF THE INVENTION

Present invention overcomes the problems associated with the design and production of highly dispersible organoclays through the use of polymeric hydrotropes which are capable of producing enhanced swelling capabilities in nonpolar systems at relatively low polymer loadings. The polymeric hydrotropes are comprised of various low-molecular-weight nonionic polymers. More particularly, the present invention provides organoclays which have a wide variety of uses including water treatment applications, as rheological control agents, and in the preparation of nanocomposites. The present method is particularly valuable because it produces a self-activated clay having an expanded basal spacing with only a minor increase in organic loading.

The present method involves adsorbing a sub-monomolecular layer of a polymeric hydrotrope onto the surface of a clay. For the purposes of this invention a clay has sub-monomolecular layer absorbed thereon if the clay surfaces have less than a substantially uniform film of polymeric hydrotrope that is one molecule thick adsorbed thereon. In addition a clay having a sub-monomolecular layer is a clay for which the adsorption capacity of the surface has not been satisfied. For example, adsorption of polyethylene glycol in amounts less than 0.3 grams of polymer per gram of clay would produce a sub-monomolecular coating. In one embodiment of the present invention, the polymeric hydrotrope is adsorbed in an amount from about 1 weight percent to about 15 weight percent, or from about 1 weight percent to about 10 weight percent relative to the weight of the clay. In certain embodiments, the hydrotrope is adsorbed in an amount from between about 2 and about 4 weight percent relative to the weight of the clay. In addition to the polymeric hydrotrope, a cationic HLB modifying surfactant, such as an amine-type surfactant, is also adsorbed onto the clay surface. This may be accomplished by subjecting the clay to cation exchange with a quaternary ammonium salt. Optionally, the properties of the clay surface can be further modified with swelling agents, such as natural and synthetic waxes. Examples of natural waxes include, but are not limited to, paraffin, microcrystalline montan, and vegetable waxes. Examples of synthetic waxes include, but are not limited to, Fisher-Tropsch, polyethylene, polypropylene, polymethylene, chemically modified waxes, and polymerized alpha-olefins. The waxes are used at levels of about 10–30 weight percent relative to the weight of the organoclay. They are used as swelling agents which provide the organoclays in a palletized form, which makes them easier to handle and speeds the rate of clay exfoliation in polyolefins and other polymers. When the organoclays of the present invention are combined with small amounts of waxes, a transparent, extrudable LLC phase is produced. Suitable clays for use in the process include the micas and smectite clays, with exchange capacities of at least 75 milliequivalents per 100 g of clay. Examples of smectite clays include hectorite, montmorillonite, beidelite, stevensite, and saponite. Synthetic micas and smectites are also acceptable.

Briefly, the process used to produce the organoclays of this invention includes the following general steps. Adsorption of the polymeric hydrotrope on the surface of the clay is achieved by dispersing the clay in a suitable solvent, such as water, dispersing and/or dissolving the polymeric hydrotrope in the solvent and allowing the polymer to adsorb on the surface of the dispersed clay. The clay is also subject to ion exchange with a cationic surfactant, which is usually a quaternary amine. Ion exchange either takes place after polymer adsorption has occurred or as polymer adsorption is occurring. In this latter embodiment, the clay is exposed to a solution containing a mixture of the polymeric hydrotrope and the cationic surfactant. The organoclay can then be separated by filtration, washed with water to remove excess salt resulting from the cation exchange, and dried to a desired solvent content. The resulting organoclay may be dispersed into a compatible solvent including desired organic solvents or used in the preperation of nanocomposites.

In an alternative process the organoclays may be produced by a dry method wherein the dry clay is mixed directly with the hydrotrope and the cationic surfactant. This method is suited for less critical applications like water treatment and drilling muds. Any mixer capable of handling high solids can be used to combine the clay and the reagents. Such mixers are well known in the and include, but are not limited to, pug mills and extruders.

The above described embodiments are set forth in the following description and illustrated in the drawings described hereinbelow.

DETAILED DESCRIPTION OF THE PREFERRED EMBODIMENTS

The present invention produces organoclays as thixotropic agents with improved efficiency and dispersability without the need for the traditional, low-molecular-weight polar activators. This is accomplished using nonionic organic polymers that act as hydrotropes in a clay dispersion. The amount of hydrotrope required to produce the advantages discussed above is considerably lower than the amount of polar activators required to produce conventional clay dispersions. As a result, the organoclays of the present invention are less expensive to produce than other currently available organoclays. The modified organoclays described herein make useful rheology control agents in a wide range of hydrophobic systems, including paints, greases, caulks, coatings, cosmetics, lubricants, oil drilling muds, binders, and adhesives.

The clays suitable for use in the invention include, without limitation, micas, smectite clays, and subgroups thereof including hectorite, montmorillonite, beidelite, stevensite, and saponite clays. As will be well understood by one skilled in the art, the clays discussed herein inherently have basal surfaces and are arranged in layers of particles which are stacked on top of one another. The stacking of the clay particles provides interlayers, or galleries, between the clay layers. These galleries are normally occupied by cations, typically comprising sodium, potassium, calcium, magnesium ions and combinations thereof, that balance the charge deficiency generated by the isomorphous substitution within the clay crystal lattice. Typically, water is also present in the galleries and tends to associate with the cations. The distance between the basal surfaces of adjacent clay layers is referred to as the basal spacing.

A specific example of clays that are suitable for use in the present invention are smectite clays that have been purified using conventional water-washing techniques. These water washing techniques include, dispersion of the clay ore in water followed by particle size separation using screens, hydrocyclones, and centrifuges in order to remove nonexfoliated clay and mineral impurities such as quartz, calcite, dolomite, feldspar etc. If the clay is not in the sodium form, it can be converted by treatment with a sodium exchange resin or alternately, a soluble sodium salt such as sodium carbonate, sodium bicarbonate, sodium hydroxide and the like may be used to effect the sodium exchange.

In one embodiment the process includes mixing a dry clay directly with a polymeric hydrotrope and a HLB modifying surfactant. In this embodiment the clay concentration in the mixture can be as high as 70 to 75 weight percent.

In another embodiment the process includes dispersing a clay in water followed by the addition of polymeric hydrotropes and HLB modifying surfactants to the dispersion. This embodiment of the process includes the dispersion of the clay in water at a solids concentration sufficient to provide a clay concentration of about 1 to 5 weight percent. Higher clay concentrations may be employed in the presence of an appropriate dispersant, however, the final clay concentration prior to ion exchange is preferably 1 to 2.5 weight percent.

Optionally, the dispersed clays may be purified. High shear, followed by particle size separation methods including screens, hydrocyclones, and centrifuges may be used to separate the clay from mineral impurities. Mineral impurities may include non-clay silicates (e.g., quartz, cristobalite, opal, talc, mica, wollastonite, spodumene, etc.) metal hydroxides (e.g., gibbsite, brucite, etc., carbonates (e.g., calcite, dolomite, etc.) sulfates (e.g., gypsum, alunite, barite, etc.) and phosphates (e.g., all minerals of the apatite group). Preferably the clay is purified to greater than 95% and more preferably to greater than 98%. In one embodiment the clay has been pre-purified utilizing conventional techniques, however pre-purification is not required.

Once the clay is dispersed, a nonionic polymeric hydrotrope is added to the clay slurry. The hydrotrope is added in an amount sufficient to form less than a complete monomolecular layer of the hydrotrope on the dispersed clay. In one embodiment the amount of hydrotrope added to the slurry is from about 1 weight percent to about 10 weight percent relative to the weight of the clay. The hydrotropes may be low-molecular-weight water-soluble polymers, polymers having limited water solubility, or mixtures thereof. The molecular weights will typically be less than 10,000 and preferably less than 5,000.

Examples of low-molecular-weight water-soluble polymers that are suitable hydrotropes for use in the present invention include, without limitation, polyvinyl alcohol, polyvinylpyrrolidone, polypropylene glycol, polybutylene glycol, methoxypolyethylene glycol, dimethoxypolyethylene glycol, polyethylene glycol, polyethylene glycol derivatives such as, polyethylene glycol acrylate, polyethylene glycol diacrylate, polyethylene glycol methyl ether acrylate, polyethylene glycol methacrylate, polyethylene glycol dimethacrylate, polyethylene glycol methyl ether methacrylate, polyethylene glycol methyl ether epoxide, polyethylene glycol diglycidyl ether, polyethylene glycol phenyl ether acrylate, polyethylene glycol bisphenol A diglycidyl ether, polyethylene glycol dibenzoate, polyethylene glycol bis(3-aminopropyl ether), polyethylene glycol butyl ether, polyethylene glycol dicarboxymethyl ether, polyethylene glycol divinyl ether, as well as copolymers of polyethylene glycol/polypropylene glycol, and polyethylene glycol/polybutylene glycol, and mixtures thereof.

Nonlimiting examples of polymers with low-water solubility that can be used as hydrotropes in the present invention include polyethylene glycol-block-polypropylene glycol-block-polyethylene glycol, polyethylene glycol-ran-polypropylene glycol, polyethylene glycol-ran-polypropylene glycol monobutyl ether, polypropylene glycol-block-polyethylene glycol-block-polypropylene glycol, polypropylene glycol monobutyl ether, polytetrahydrofuran, polytetrahydrofuran bis(3-aminopropyl), polyethylene-block-polyethylene glycol and polypropylene glycol, and mixtures thereof.

In addition to undergoing adsorption of the polymeric hydrotropes, the organoclays of this invention also undergo ion exchange reactions with cationic surfactants which act as HLB modifying agents. Cationic surfactant modifying agents include amine salt-type, phosphonium salt-type, and sulfonium salt-type surfactants. Typically, the modifying agent is a quaternary ammonium salt. Such salts, which are well known in the art, include: dimethyl benzyl hydrogenated tallow ammonium, dimethyl benzyl octadecyl ammonium, methyl benzyl dihydrogenated tallow ammonium, dimethyl dihydrogenated tallow ammonium, trimethyl hydrogenated tallow ammonium, trimethyl octadecyl ammonium, dimethyl didodecyl ammonium, methyl trioctadecyl ammonium, dimethyl dioctadecyl ammonium, methyl tallow bis-2-hydroxyethyl ammonium, dimethyl dicoco ammonium, methyl dibenzyl coco ammonium, dibenzyl dicoco ammonium, tribenzyl coco ammonium, and mixtures thereof. In one embodiment of the invention the polymeric hydrotropes are adsorbed onto the clay prior to adsorbing a cationic surfactant onto the surface of the clay. Alternatively, the clays may be exposed to a dispersion or mixture containing both the polymeric hydrotrope and the cationic surfactant such that hydrotrope absorption occurs substantially simultaneously with ion exchange. In this case, elevated temperatures are used to speed the ion exchange process. This approach is especially desirable in cases where the hydrotrope is a water-soluble polymer, such as a polyethylene glycol, which exhibits a cloud point. At temperatures above the cloud point, the water solubility of the polymer is drastically reduced and could otherwise cause the clay particles to flocculate and interfere with the ion exchange process. Combining the polymer with the cationic surfactant maintains the dispersed state of the polymer and the clay during the surface modification.

The process for producing the organophilic clays is exemplified in a general manner in the following discussion. This discussion merely provides a description of one non-limiting embodiment of the process and is not intended to limit the scope of the invention.

In a typical process, a clay is dispersed in water at a solids concentration of 1 to 5 weight percent, preferably about 1 to 3 weight percent. Optionally, application of heat or high shear can be used to ensure that the individual clay platelets are completely hydrated and exfoliated. Once the clay is dispersed, a nonionic polymeric hydrotrope is added to the dispersion. The amount of hydrotrope added should be limited to an amount sufficient to form a sub-monomolecular layer the hydrotrope on the clay. In one embodiment the hydrotrope is added in an amount from 0.5 to about 10 weight percent preferably 0.5 to 5 weight percent, relative to the weight of the dispersed clay. A cationic surfactant is then added, preferably at a temperature of about 50 to 70° C. Examples of cationic surfactants which are suitable to produce organophilic clays include quaternary ammonium salts, preferably having at least one R-chain of ten carbons or greater, phosphonium salts, and sulfonium salts. Preferably, the cationic surfactant loading will be between about 90 and about 110 milliequivalents per 100 g clay. To produce organoclays readily dispersible in nonaqueous systems, the cation exchange is carried out to the extent necessary to produce a hydrophobic surface compatible with the desired solvent system. Typically, this requires 50 to 100 percent conversion of the cation exchange capacity of the clay but may be as high as 120 percent.

The resulting organoclay may be separated and recovered by filtration. The clay can then be further dewatered by pressure filtration to a solids content of about 20 to 65 weight percent. The organoclay can also be washed with water to remove the sodium salt produced during the amine exchange reaction. The hydrophobic organoclay may be thermally dried to a residual moisture content of less than about 2 weight percent or less and crushed to a fine powder. In one embodiment the organoclays are dried to a moisture content of less than two percent by weight and may be dried to a moisture content less than between about 0.5 and about 1 weight percent. The drying steps may include spray drying, flash drying, freeze drying, and vacuum drying. These steps may be used individually or in combination.

The disclosed processes, which involve the attachment of polymeric hydrotropes, either before or during cation exchange, produce a preactivated organoclay that can be dispersed in solvents and polymers without additional activators, coupling agents or compitabilizers as is the case with conventional organoclays, resulting in a significant reduction in the total organic loading of the organoclay. This has the advantage of making it possible to produce organoclays especially useful in the preparation of nanocomposites at a greatly reduced cost. Additionally, the disclosed approach produces materials that are easy to dry and redisperse. Furthermore, the disclosed approach permits more precise control over the surface HLB value than previously disclosed methods of producing organoclays.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above.

EXAMPLES

The following non-limiting examples serve to further illustrate advantages of the disclosed invention.

In each example below, the settling volume of the organoclay in heptane was measured to illustrate the superior swelling and dispersion capabilities of the organoclays produced by this invention. The measurements were obtained as follows. Ground organoclay powder was added slowly in portions to heptane in a graduated cylinder and each portion was allowed to solvate and settle before adding the next. After the sample addition was completed, the cylinder was inverted 30 times to disperse the organoclay. After one hour, the settling volume of the solids was recorded as mL per gram of organoclay. This procedure was used as an indication of both the settling volume and the ease of dispersion of the organoclay. The settling volume after one hour was used as an indication of the ease of dispersion since the settling rate is expected to be a function of particle size distribution created during inversion of the cylinder. The values reported are not considered absolute measurements since initial particle size distribution and slight variations in the rate of addition can affect the settling rates and volumes. The values reported are therefore meant to provide an indication of relative performance. An attempt to measure the settling volume in toluene was unsuccessful due to the fact that the organoclays of this invention dissolved completely and produced transparent solutions. A comparative example using the commercially available organoclay Cloisite® 15A is provided as a basis for comparison with prior technology. (A product of Southern Clay Products, Cloisite 15A is a montmorillonite clay modified with 125 milliequivalants of dimethyl dihydrogenated tallow ammonium chloride per 100 g of clay.) Cloisite 15A is sold as a plastics additive and intended to improve various physical properties such as reinforcement and heat distortion temperature. The ability to disperse in hydrophobic polymers is a critical aspect of its performance.

Example 1

Figure 1:
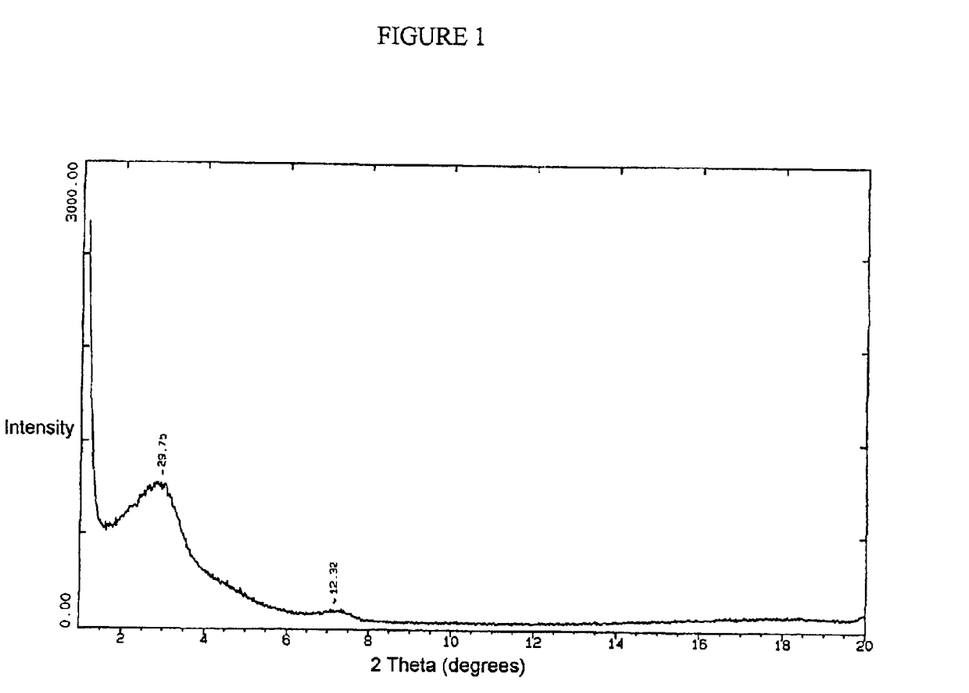
FIG. 1 is an x-ray diffraction pattern showing the basal spacing of a montmorillonite clay intercalated with 95 mer dimethyl dihydrogenated tallow amine and 4 weight percent polyethylene glycol 1500 prepared according to Example 1.

A commercially available montmorillonite (Cloisite® Na, a product of Southern Clay Products,) was dispersed in hot, deionized water at a temperature of approximately 40° C. and a solids concentration of 2 weight percent by high shear mixing for 40 minutes to ensure complete hydration and delamination of the clay platelets. An aqueous dispersion of polyethylene glycol, with a molecular weight of 1500, was added to the clay dispersion at a polymer to clay ratio of 4 weight percent and mixed at high shear for 15 minutes. An aqueous dispersion of dimethyl dihydrogenated tallow ammonium chloride (Arquad® 2HT-75, a product of Akzo Nobel) was prepared at a surfactant concentration of 4 weight percent and heated to 60° C., then slowly added over a period of 30 minutes to the clay dispersion. Prior to the addition of the quaternary amine solution, the temperature of the clay dispersion was raised to approximately 60 to 70° C. The amount of quaternary amine used relative to the weight of the clay was sufficient to produce a milliequivalant ratio (mer) of 95. The mixing was continued for an additional 30 minutes. The solids were decanted, washed with hot water, vacuum filtered and dried at 45° C. overnight producing a fine white powder. The settling volume of the organoclay in heptane at room temperature is shown in Table 1 and indicates superior performance. The x-ray diffraction pattern showing the d(001) spacing of the organoclay is shown in FIG. 1. The d(001) reflection occurs at approximately 30 Å.

Example 2

Figure 2:
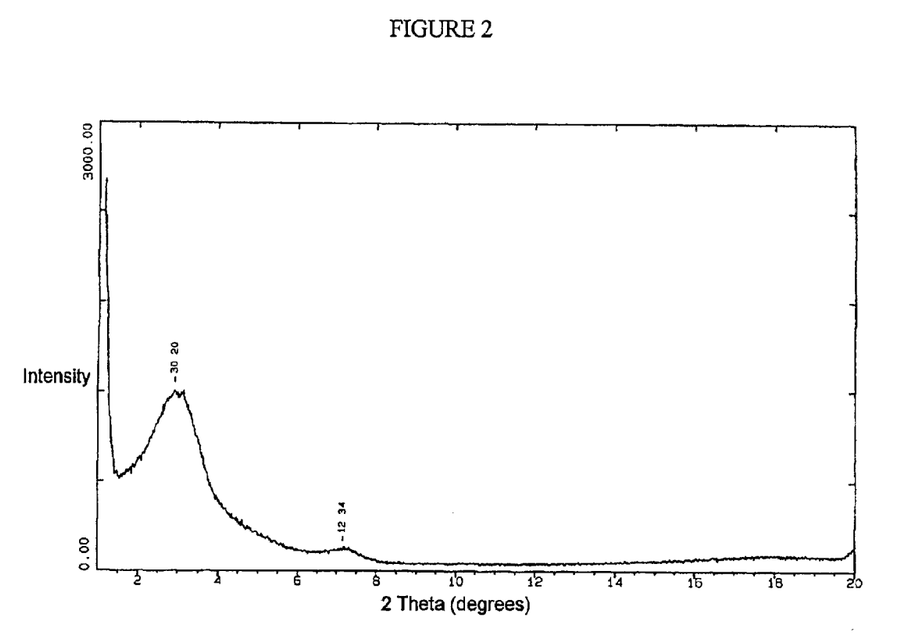
FIG. 2 is an x-ray diffraction pattern showing the basal spacing of a montmorillonite clay intercalated with 95 mer dimethyl dihydrogenated tallow amine and 4 weight percent polyethylene glycol 1500 prepared according to Example 2.

A commercially available montmorillonite (Cloisite® Na) was dispersed in hot, deionized water at a temperature of approximately 40° C. and a solids concentration of 2 weight percent by high shear mixing for 40 minutes to ensure complete hydration and delamination of the clay platelets. An aqueous dispersion of polyethylene glycol with a molecular weight of 1500, and dimethyl dihydrogenated tallow ammonium chloride (Arquad® 2HT-75) was prepared at a surfactant concentration of 4 weight percent and heated to 60° C., then slowly added over a period of 30 minutes to the clay dispersion. Prior to the addition of the quaternary amine solution, the temperature of the clay dispersion was raised to approximately 60 to 70° C. The amount of quaternary amine used relative to the weight of the clay was sufficient to produce a milliequivalant ratio of 95 while the amount of polyethylene glycol used was 4 weight percent relative to the weight of the clay. The mixing was continued for an additional 30 minutes. The solids were decanted, washed with hot water, dewatered in a filter press, and dried at 45° C. overnight. The dried product was ground to a fine white powder and the settling volume in heptane was measured at room temperature. The result is shown in Table 1 and indicates superior performance. The x-ray diffraction pattern showing the d(001) spacing of the organoclay is shown in FIG. 2. The d(001) spacing occurs at approximately 30 Å and is identical to the value obtained in Example 1 despite the differences in the process. The settling volume, however, is lowered suggesting that activation by the polyethylene glycol only partially offsets the effect of pressure filtration.

Example 3

Figure 3:
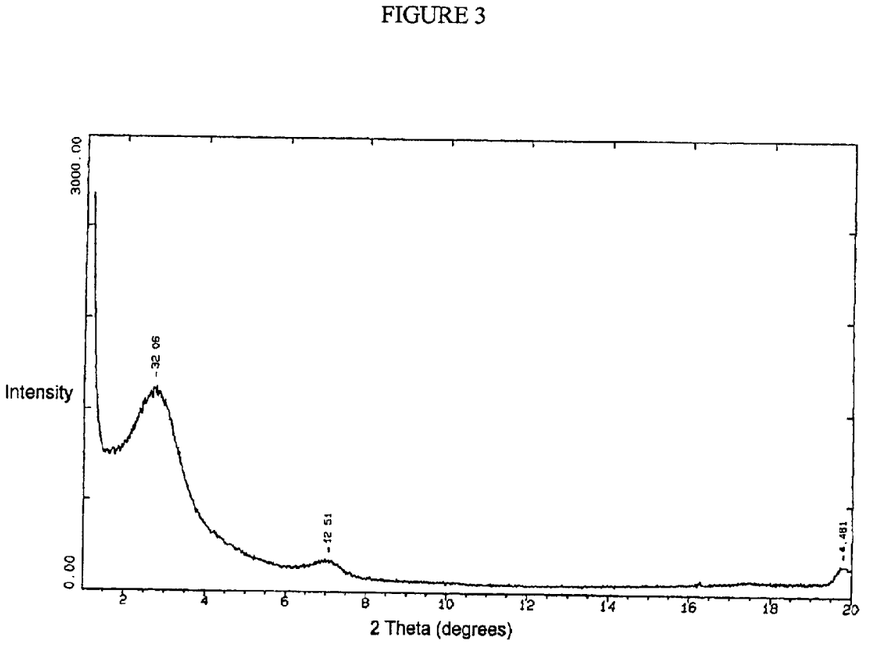
FIG. 3 is an x-ray diffraction pattern showing the basal spacing of a montmorillonite clay intercalated with 95 mer dimethyl dihydrogenated tallow amine and 4 weight percent polypropylene glycol 3500 prepared according to Example 3.

A commercially available montmorillonite (Cloisite Na®) was dispersed in hot, deionized water at a temperature of approximately 40° C. and a solids concentration of 2 weight percent by high shear mixing for 40 minutes to ensure complete hydration and delamination of the clay platelets. An aqueous dispersion of polypropylene glycol with a molecular weight of 3500, and dimethyl dihydrogenated tallow ammonium chloride (Arquad® 2HT-75) was prepared at a surfactant concentration of 2 weight percent and heated to 60° C., then slowly added over a period of 30 minutes to the clay dispersion. Prior to the addition of the quaternary amine solution, the temperature of the clay dispersion was raised to approximately 60 to 70° C. The amount of quaternary amine used relative to the weight of the clay was sufficient to produce a milliequivalant ratio of 95 while the amount of polypropylene glycol used was 4 weight percent relative to the weight of the clay. The mixing was continued for an additional 30 minutes. The solids were decanted, washed with hot water, dewatered in a filter press, and dried at 45° C. overnight. The dried product was ground to a fine white powder and the settling volume in heptane was measured at room temperature. The result is shown in Table 1 and indicates superior performance. The x-ray diffraction pattern showing the d(001) spacing is shown in FIG. 3. The d(001) spacing occurs at approximately 32 Å.

Example 4

Figure 4:
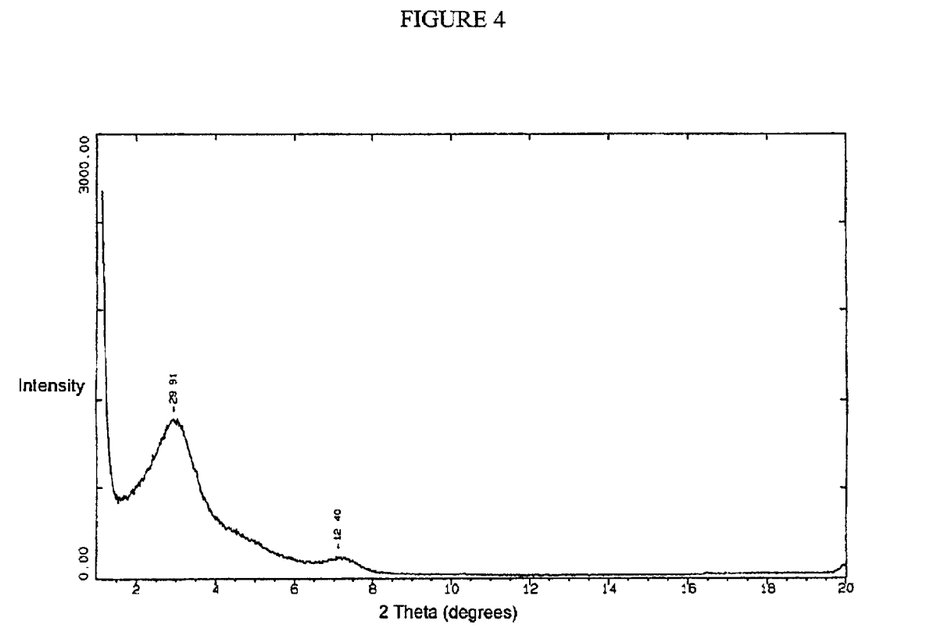
FIG. 4 is an x-ray diffraction pattern showing the basal spacing of a montmorillonite clay intercalated with 95 mer dimethyl dihydrogenated tallow amine and 4 weight percent polytetrahydrofuran 1000 prepared according to Example 4.

A commercially available montmorillonite (Cloisite Na®) was dispersed in hot, deionized water at a temperature of approximately 40° C. and a solids concentration of 2 weight percent by high shear mixing for 40 minutes to ensure complete hydration and delamination of the clay platelets. An aqueous dispersion containing polytetrahydrofuran with a molecular weight of 1000, and dimethyl dihydrogenated tallow ammonium chloride (Arquad® 2HT-75) was prepared at a surfactant concentration of 2 weight percent and heated to 60° C., then slowly added over a period of 30 minutes to the clay dispersion. Prior to the addition of the quaternary amine solution, the temperature of the clay dispersion was raised to approximately 60 to 70° C. The amount of quaternary amine relative to the weight of the clay was sufficient to produce a milliequivalant ratio of 95 while the amount of polytetrahydrofuran used was 4 weight percent relative to the weight of the clay. The mixing was continued for an additional 30 minutes. The solids were decanted, washed with hot water, dewatered in a filter press, and dried at 45° C. overnight. The dried product was ground to a fine white powder and the settling volume in heptane was measured at room temperature. The result is shown in Table 1 and indicates superior swelling performance. The x-ray diffraction pattern showing the basal spacing of the organoclay is shown in FIG. 4. The d(001) spacing is approximately 29 Å. Despite the alignment of the clay platelets by the pressure filtration, the settling volume is almost as large as that of Example 1 indicating that effectiveness of the hydrotrope.

Example 5

Figure 5:
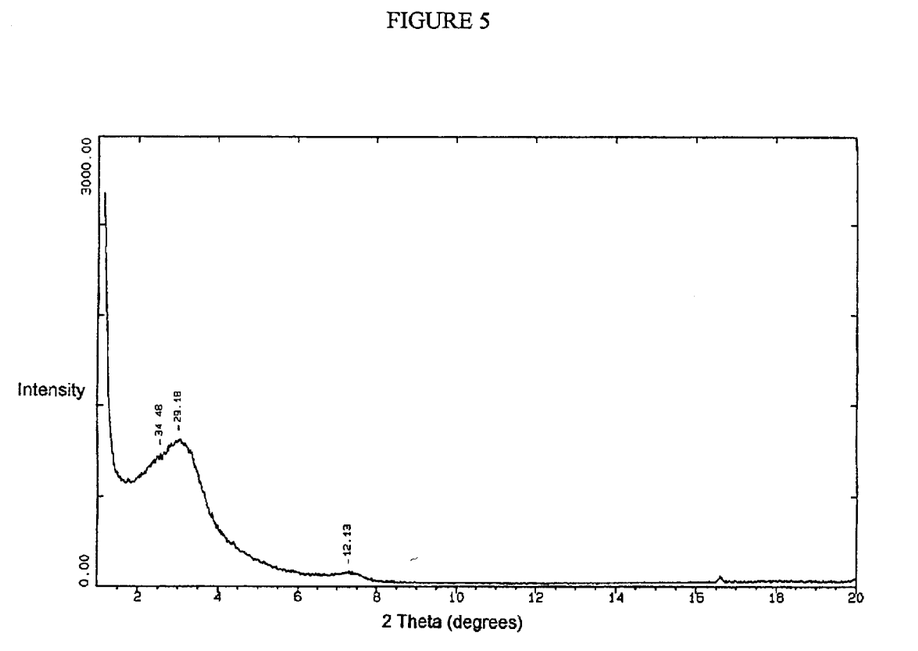
FIG. 5 is an x-ray diffraction pattern showing the basal spacing of a montmorillonite clay intercalated with 110 mer dimethyl dihydrogenated tallow amine and 4 weight percent polyethylene glycol 1000 prepared according to Example 5.

A commercially available montmorillonite (Cloisite Na®) was dispersed in hot, deionized water at a temperature of approximately 40° C. and a solids concentration of 2 weight percent by high shear mixing for 40 minutes to ensure complete hydration and delamination of the clay platelets. An aqueous dispersion of polypropylene glycol with a molecular weight of 1000, and dimethyl dihydrogenated tallow ammonium chloride (Arquad® 2HT-75) was prepared at a surfactant concentration of 2 weight percent and heated to 60° C., then slowly added over a period of 30 minutes to the clay dispersion. Prior to the addition of the quaternary amine solution, the temperature of the clay dispersion was raised to approximately 60 to 70° C. The amount of quaternary amine relative to the weight of the clay was sufficient to produce a milliequivalant ratio of 110 while the amount of polypropylene glycol used was 4 weight percent relative to the weight of the clay. The mixing was continued for an additional 30 minutes. The solids were decanted, washed with hot water, dewatered in a filter press, and dried at 45° C. overnight. The dried product was ground to a fine white powder and the settling volume in heptane was measured at room temperature. The result is shown in Table 1 which indicates superior swelling/dispersion performance. The x-ray diffraction pattern showing the basal spacing is shown in FIG. 5. The d(001) spacing is approximately 29 Å. Despite having the lowest d(001) spacing, this material exhibited the largest settling volume which was approximately 5 times greater than materials produced by prior art as represented in Comparative Example 1.

Example 6

Figure 6:
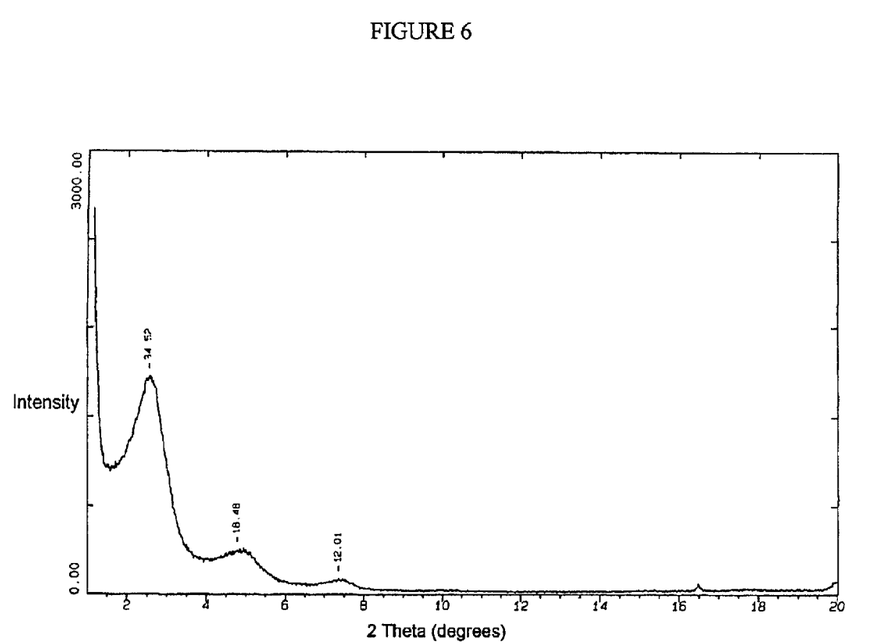
FIG. 6 is an x-ray diffraction pattern showing the basal spacing of a montmorillonite clay intercalated with 110 mer dimethyl dihydrogenated tallow amine and 4 weight percent polytetrahydrofuran 1000 prepared according to Example 6.

A commercially available montmorillonite (Cloisite Na®) was dispersed in hot, deionized water at a temperature of approximately 40° C. and a solids concentration of 2 weight percent by high shear mixing for 40 minutes to ensure complete hydration and delamination of the clay platelets. An aqueous dispersion containing polytetrahydrofuran with a molecular weight of 1000, and dimethyl dihydrogenated tallow ammonium chloride (Arquad® 2HT-75) was prepared at a surfactant concentration of 2 weight percent and heated to 60° C., then slowly added over a period of 30 minutes to the clay dispersion. Prior to the addition of the quaternary amine solution, the temperature of the clay dispersion was raised to approximately 60 to 70° C. The amount of quaternary amine relative to the weight of the clay was sufficient to produce a milliequivalant ratio of 110 while the amount of polytetrahydrofuran used was 4 weight percent relative to the weight of the clay. The mixing was continued for an additional 30 minutes. The solids were decanted, washed with hot water, dewatered in a filter press, and dried at 45° C. overnight. The dried product was ground to a fine white powder and the settling volume in heptane was measured at room temperature. The result is shown in Table 1 which indicates superior swelling/dispersion performance. The x-ray diffraction pattern showing the basal spacing of the organoclay is shown in FIG. 6. The d(001) spacing is approximately 34.5 Å.

Example 7

Figure 7:
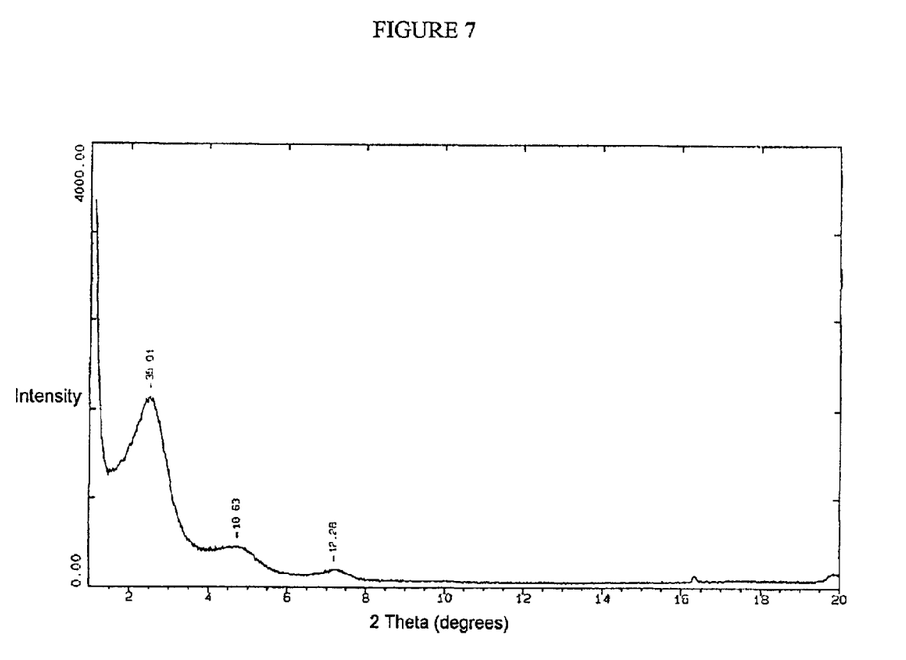
FIG. 7 is an x-ray diffraction pattern showing the basal spacing of a montmorillonite clay intercalated with 110 mer dimethyl dihydrogenated tallow amine and 4 weight percent polyethylene-block-polyethylene glycol 2250 prepared according to Example 7.

A commercially available montmorillonite (Cloisite Na®) was dispersed in hot, deionized water at a temperature of approximately 40° C. and a solids concentration of 2 weight percent by high shear mixing for 40 minutes to ensure complete hydration and delamination of the clay platelets. An aqueous dispersion containing polyethylene-block-polyethylene glycol with a molecular weight of 2250 and an HLB value of 15, and dimethyl dihydrogenated tallow ammonium chloride (Arquad® 2HT-75) was prepared at a surfactant concentration of 2 weight percent and heated to 60° C., then slowly added over a period of 30 minutes to the clay dispersion. Prior to the addition of the quaternary amine solution, the temperature of the clay dispersion was raised to approximately 60 to 70° C. The amount of quaternary amine relative to the weight of the clay was sufficient to produce a milliequivalant ratio of 110 while the amount of polyethylene-block-polyethylene glycol used was 2 weight percent relative to the weight of the clay. The mixing was continued for an additional 30 minutes. The solids were decanted, washed with hot water, dewatered in a filter press, and dried at 45° C. overnight. The dried product was ground to a fine white powder and the settling volume in heptane was measured at room temperature. The result is shown in Table 1 which indicates superior swelling/dispersion performance. The x-ray diffraction pattern showing the basal spacing is shown in FIG. 7. The d(001) spacing is approximately 35 Å.

Comparative Example 1

The performance of prior art is represented by that of the commercially available organoclay Cloisite® 15 Å (a product of Southern Clay Products). The published d(001) spacing of this organoclay is 31.5 Å. Its settling volume in heptane was measured and the result is shown in Table 1. Despite having the highest quaternary amine loading, its settling volume is significantly lower than all of the other examples. This suggests that activation by relatively small concentrations of hydrotropic agents can have profound effects on the surface chemistry of organoclays.

TABLE 1

|  | MER | D(001), Å | Settling volume, mL/g |
|---|---|---|---|
| Example 1 | 95 | 30.0 | 25.4 |
| Example 2 | 95 | 30.2 | 16.3 |
| Example 3 | 95 | 32.0 | 18.0 |
| Example 4 | 95 | 29.9 | 23.8 |
| Example 5 | 110 | 29.2 | 31.7 |
| Example 6 | 110 | 34.5 | 21.5 |
| Example 7 | 110 | 35.0 | 19.0 |
| Comp. Ex. 1 | 125 | 31.5 | 6.5 |

While preferred embodiments have been illustrated and described, it should be understood that changes and modifications can be made therein in accordance with one of ordinary skill in the art without departing from the invention in its broader aspects. Various features of the invention are defined in the following claims.

What is claimed is:

1. A method for preparing organoclays comprising the steps of:
   (a) dispersing a clay in an aqueous solution comprising a polymeric hydrotrope, wherein the average molecular weight of the polymeric hydrotrope is 5,000 or less;
   (b) adsorbing sub-monomolecular layer of the polymeric hydrotrope on the clay; and
   (c) adsorbing an HLB modifying cationic surfactant on the clay.

2. The method of claim 1 wherein the polymeric hydrotrope is a water soluble polymer selected from the group consisting of polyvinyl alcohol, polyvinylpyrrolidone, polyethylene glycol, polypropylene glycol, polybutylene glycol, methoxypolyethylene glycol, dimethoxypolyethylene glycol, polyethylene glycol derivatives, copolymers of polyethylene glycol and polypropylene glycol, and copolymers of polyethylene glycol, polybutylene glycol and combinations thereof.

3. The method of claim 1 wherein the polymeric hydrotrope is a water soluble polymer comprising a polyethylene glycol derivative selected from the group consisting of polyethylene glycol acrylate, polyethylene glycol diacrylate, polyethylene glycol methyl ether acrylate, polyethylene glycol methacrylate, polyethylene glycol dimethacrylate, polyethylene glycol methyl ether methacrylate, polyethylene glycol methyl ether epoxide, polyethylene glycol diglycidyl ether, polyethylene glycol phenyl ether acrylate, polyethylene glycol bisphenol A diglycidyl ether, polyethylene glycol dibenzoate, polyethylene glycol bis(3-aminopropyl ether), polyethylene glycol butyl ether, polyethylene glycol dicarboxymethyl ether, and polyethylene glycol divinyl ether.

4. The method of claim 1, wherein the polymeric hydrotrope is a polymer having limited water solubility selected from the group consisting of polyethylene glycol-block-polypropylene glycol-block-polyethylene glycol, polyethylene glycol-ran-polypropylene glycol, polyethylene glycol-ran-polypropylene glycol monobutyl ether, polypropylene glycol-block-polyethylene glycol-block-polypropylene glycol, polypropylene glycol monobutyl ether, polytetrahydrofuran, polytetrahydrofuran bis(3-aminopropyl), polyethylene-block-polyethylene glycol, polypropylene glycol, and combinations thereof.

5. The method of claim 1 wherein the polymeric hydrotrope is adsorbed onto the clay prior to adsorbing the HLB modifying surfactant on the surface of the clay.

6. The method of claim 1 wherein the clay is exposed to a solution containing both the polymeric hydrotrope and the HLB modifying surfactant, such that adsorption of the surfactant to the clay and adsorption of the hydrotrope on the clay occur substantially simultaneously.

7. The method of claim 1 wherein the HLB modifying surfactant is selected from the group consisting of amine salts phosphonium salts, and sulfonium salts.

8. The method of claim 1 wherein the HLB modifying surfactant is a quaternary ammonium ion.

9. The method of claim 1 wherein the organoclay has a polymeric hydrotrope loading of about 15 weight percent or less than 15 weight percent.

10. The method of claim 1 further comprising the steps of drying the organoclay and blending the dried organoclay with a swelling agent selected from natural and synthetic waxes.

11. The method of claim 10 wherein the amount swelling agent blended with the dried organoclay is between about 10 and about 30 weight percent relative to the weight of the organoclay.

12. The method of claim 10 wherein the swelling agent is a natural wax selected from the group consisting of paraffin, microcrystalline montan, and vegetable waxes.

13. The method of claim 10 wherein the swelling agent is a synthetic wax selected from the group consisting of Fisher-Tropsch, polyethylene, polypropylene, ethylene/propylene copolymers, polymethylene, chemically modified waxes, polymerized alpha-olefins, and combinations thereof.

14. A method for preparing organoclays comprising:
  (a) dispersing a clay in an aqueous solution comprising a polymeric hydrotrope, wherein the average molecular weight of the polymeric hydrotrope is 5,000 or less;
  (b) adsorbing from about 0.1 to about 15 percent by weight, relative to the weight of the clay, of the polymeric hydrotrope on the clay; and
  (c) adsorbing a HLB modifying cationic surfactant on the clay.

15. The method of claim 14 wherein the polymeric hydrotrope is adsorbed in an amount between about 1 and about 10 percent by weight, relative to the weight of the clay.

16. The method of claim 14 wherein the polymeric hydrotrope is a water soluble polymer selected from the group consisting of polyvinyl alcohol, polyvinylpyrrolidone, polyethylene glycol, polypropylene glycol, polybutylene glycol, methoxypolyethylene glycol, dimethoxypolyethylene glycol, polyethylene glycol derivatives, copolymers of polyethylene glycol and polypropylene glycol, and copolymers of polyethylene glycol, polybutylene glycol and combinations thereof.

17. The method of claim 14 wherein the polymeric hydrotrope is a water soluble polymer comprising a polyethylene glycol derivative selected from the group consisting of polyethylene glycol acrylate, polyethylene glycol diacrylate, polyethylene glycol methyl ether acrylate, polyethylene glycol methacrylate, polyethylene glycol dimethacrylate, polyethylene glycol methyl ether methacrylate, polyethylene glycol methyl ether epoxide, polyethylene glycol diglycidyl ether, polyethylene glycol phenyl ether acrylate, polyethylene glycol bisphenol A diglycidyl ether, polyethylene glycol dibenzoate, polyethylene glycol bis(3-aminopropyl ether), polyethylene glycol butyl ether, polyethylene glycol dicarboxymethyl ether, and polyethylene glycol divinyl ether.

18. The method of claim 14 wherein the polymeric hydrotrope is a polymer having limited water solubility selected from the group consisting of polyethylene glycol-block-polypropylene glycol-block-polyethylene glycol, polyethylene glycol-ran-polypropylene glycol, polyethylene glycol-ran-polypropylene glycol monobutyl ether, polypropylene glycol-block-polyethylene glycol-block-polypropylene glycol, polypropylene glycol monobutyl ether, polytetrahydrofuran, polytetrahydrofuran bis(3-aminopropyl), polyethylene-block-polyethylene glycol, polypropylene glycol, and combinations thereof.

19. The method of claim 14 wherein the polymeric hydrotrope is adsorbed onto the clay prior to adsorbing the HLB modifying surfactant on the surface of the clay.

20. The method of claim 14 wherein the clay is exposed to a solution containing both the polymeric hydrotrope and the HLB modifying surfactant, such that adsorption of the surfactant to the clay and adsorption of the hydrotrope on the clay occur substantially simultaneously.

21. The method of claim 14 wherein the HLB modifying surfactant is selected from the group consisting of amine salts, phosphonium salts, and sulfonium salts.

22. The method of claim 14 wherein the HLB modifying surfactant is a quaternary ammonium ion.

23. The method of claim 14 further comprising the steps of drying the organoclay and blending the dried organoclay with a swelling agent selected from natural and synthetic waxes.

24. The method of claim 23 wherein the amount of swelling agent blended with the dried organoclay is between about 10 and about 30 weight percent relative to the weight of the clay.

25. The method of claim 23 wherein the swelling agent is a natural wax selected from the group consisting of paraffin, microcrystalline montan, and vegetable waxes.

26. The method of claim 23 wherein the swelling agent is a synthetic wax selected from the group consisting of Fisher-Tropsch, polyethylene polypropylene, ethylene/propylene copolymers, polymethylene, chemically modified waxes, polymerized alpha-olefins, and combinations thereof.

27. A method for preparing organoclays comprising:
  (a) mixing a clay with a polymeric hydrotrope having an average molecular weight of 5000 or less and an HLB modifying cationic surfactant;
  (b) adsorbing from about 0.1 to about 15 percent by weight, relative to the weight of the clay, of the polymeric hydrotrope on the clay; and
  (c) adsorbing the HLB modifying cationic surfactant on the clay.

28. The method of claim 27 wherein the polymeric hydrotrope is adsorbed in an amount between about 1 and about 10 percent by weight, relative to the weight of the clay.

29. The method of claim 27 wherein the polymeric hydrotrope is a water soluble polymer selected from the group consisting of polyvinyl alcohol, polyvinylpyrrolidone, polyethylene glycol, polypropylene glycol, polybutylene glycol, methoxypolyethylene glycol, dimethoxypolyethylene glycol, polyethylene glycol derivatives, copolymers of polyethylene glycol and polypropylene glycol, and copolymers of polyethylene glycol, polybutylene glycol and combinations thereof.

30. The method of claim 27 wherein the polymeric hydrotrope is a water soluble polymer comprising a polyethylene glycol derivative selected from the group consisting of polyethylene glycol acrylate, polyethylene glycol diacrylate, polyethylene glycol methyl ether acrylate, polyethylene glycol methacrylate, polyethylene glycol dimethacrylate, polyethylene glycol methyl ether methacrylate, polyethylene glycol methyl ether epoxide, polyethylene glycol diglycidyl ether, polyethylene glycol phenyl ether acrylate, polyethylene glycol bisphenol A diglycidyl ether, polyethylene glycol dibenzoate, polyethylene glycol bis(3-aminopropyl ether), polyethylene glycol butyl ether, polyethylene glycol dicarboxymethyl ether, and polyethylene glycol divinyl ether.

31. The method of claim 27 wherein the polymeric hydrotrope is a polymer having limited water solubility selected from the group consisting of polyethylene glycol-block-polypropylene glycol-block-polyethylene glycol, polyethylene glycol-ran-polypropylene glycol, polyethylene glycol-ran-polypropylene glycol monobutyl ether, polypropylene glycol-block-polyethylene glycol-block-polypropylene glycol, polypropylene glycol monobutyl ether, polytetrahydrofuran, polytetrahydrofuran bis(3-aminopropyl), polyethylene-block-polyethylene glycol, polypropylene glycol, and combinations thereof.

32. The method of claim 27 wherein the polymeric hydrotrope is adsorbed onto the clay prior to adsorbing the HLB modifying surfactant on the surface of the clay.

33. The method of claim 27 wherein the clay is exposed to a mixture containing both the polymeric hydrotrope and the HLB modifying surfactant, such that adsorption of the surfactant to the clay and adsorption of the hydrotrope on the lay occur substantially simultaneously.

34. The method of claim 27 wherein the HLB modifying surfactant is selected from the group consisting of amine salts, phosphonium salts, and sulfonium salts.

35. The method of claim 27 wherein the HLB modifying surfactant is a quaternary ammonium ion.

36. The method of claim 27 further comprising the step of blending the organoclay with a swelling agent selected from natural and synthetic waxes.

37. The method of claim 36 wherein the amount of swelling agent blended with the organoclay is between about 10 and about 30 weight percent relative to the weight of the clay.

38. The method of claim 36 wherein the swelling agent is a natural wax selected from the group consisting of paraffin, microcrystalline montan, and vegetable waxes.

39. The method of claim 36 wherein the swelling agent is a synthetic wax selected from the group consisting of Fisher-Tropsch, polyethylene, polypropylene, ethylene/propylene copolymers, polymethylene, chemically modified waxes, polymerized alpha-olefins, and combinations thereof.

* * * * *